US012292179B1

(12) United States Patent
Li

(10) Patent No.: US 12,292,179 B1
(45) Date of Patent: May 6, 2025

(54) PROJECTION LAMP FOR PRODUCING STARRY SKY AND GALAXY EFFECTS

(71) Applicant: Shanxia Li, Zhongshan (CN)

(72) Inventor: Shanxia Li, Zhongshan (CN)

( * ) Notice: Subject to any disclaimer, the term of this patent is extended or adjusted under 35 U.S.C. 154(b) by 0 days.

(21) Appl. No.: 18/765,396

(22) Filed: Jul. 8, 2024

(51) Int. Cl.
*F21S 10/00* (2006.01)
*F21V 17/12* (2006.01)
*F21V 29/50* (2015.01)

(52) U.S. Cl.
CPC .............. *F21V 17/12* (2013.01); *F21V 29/50* (2015.01)

(58) Field of Classification Search
CPC ........ F21S 10/002; F21S 10/007; F21S 6/004; F21V 5/02; F21V 5/04; F21V 14/08; F21V 29/70; F21V 21/30; F21V 5/045; F21V 23/045; F21V 11/00; F21V 14/00; F21W 2121/008; F21Y 2115/10; F21Y 2113/20; F21Y 2115/30
See application file for complete search history.

(56) References Cited

U.S. PATENT DOCUMENTS

2021/0247039 A1* 8/2021 Zheng ........................ F21V 5/04

* cited by examiner

*Primary Examiner* — Elmito Breval
(74) *Attorney, Agent, or Firm* — Jose Cherson Weissbrot

(57) ABSTRACT

The present disclosure discloses a projection lamp for producing starry sky and galaxy effects. The projection lamp includes a lamp holder, a light source, an optical lens, and a first casing. The light source is arranged on one side of the lamp holder; the first casing is arranged on one side of the top of the lamp holder; a second casing is arranged on the other side of the top of the lamp holder; clamping slots are uniformly arranged at the bottoms of the first casing and the second casing; clamping blocks matched with the clamping slots are uniformly arranged on an outer side of the lamp holder; a bracket is arranged at top ends of the second casing and the first casing; the optical lens is arranged inside the bracket through a lens sleeve; and a projection plate is arranged between the optical lens and the light source.

6 Claims, 4 Drawing Sheets

PROJECTION LAMP FOR PRODUCING STARRY SKY AND GALAXY EFFECTS

TECHNICAL FIELD

The present disclosure relates to the technical field of projection lamps, and specifically relates to a projection lamp for producing starry sky and galaxy effects.

BACKGROUND

Starry sky and galaxy lamps generally refer to a type of atmosphere lamps. Such type of lamps can project patterns such as countless stars or galaxy on a wall or ceiling, which can play a role in creating atmosphere and decorating the landscape. Such lamps can provide a very comfortable and quiet starry night sky in a bedroom, and the starry night sky creates a wonderful and quiet environment, helps sleep, and can also create other very romantic environments. Therefore, such lamps have a very wide range of applications in life.

General starry sky and galaxy lamps realize pattern projection through hollow lampshades, which often cannot project real star cloud, and the projection effect is not good. Moreover, such projection lamps are generally integrated structures, which are not easy to disassemble and are not conducive to overhaul and maintenance when a fault occurs. Therefore, it is necessary to provide a projection lamp for producing starry sky and galaxy effects.

SUMMARY

A purpose of the present disclosure is to provide a projection lamp for producing starry sky and galaxy effects to solve the problems proposed in the above background.

To achieve the above purpose, the present disclosure provides the following technical solution. A projection lamp for producing starry sky and galaxy effects includes a lamp holder, a light source, an optical lens, and a first casing. The light source is arranged on one side of the lamp holder; the first casing is arranged on one side of the top of the lamp holder; a second casing is arranged on the other side of the top of the lamp holder; clamping slots are uniformly arranged at the bottoms of the first casing and the second casing; clamping blocks matched with the clamping slots are uniformly arranged on an outer side of the lamp holder; a control panel is arranged inside the first casing and the second casing; a bracket is arranged at top ends of the second casing and the first casing; the optical lens is arranged inside the bracket through a lens sleeve; a projection plate is arranged between the optical lens and the light source; and a film cover is arranged on one side of the projection plate.

Preferably, heat dissipation slots are uniformly formed at the bottom of the lamp holder, and the heat dissipation slots are distributed in a concentric circle structure with respect to the lamp holder.

Preferably, a base is arranged at the bottom of the lamp holder, a ball head screw hole is formed at the top of the base, a ball head screw is arranged at the bottom of the lamp holder, and the ball head screw is connected to the ball head screw hole.

Preferably, connecting holes are uniformly formed on one side of the first casing close to the second casing, and connecting posts corresponding to the connecting holes are uniformly arranged on one side of the second casing close to the first casing.

Preferably, the base is an umbrella-shaped structure, a bottom plate is arranged at a bottom end of the base, and the bottom plate is fixedly connected to the base through 3 groups of fasteners.

Preferably, the control panel is provided with a button, and a decorative plate is arranged on one side of the button.

Preferably, the second casing is provided with a reserved hole, and the button extends through the reserved hole to outside of the second casing.

Compared with the prior art, the present disclosure has the following beneficial effects: In the projection lamp for producing starry sky and galaxy effects, by the installation of the lamp holder, the light source, the projection plate, the first casing, the second casing, the optical lens, the bracket, the connecting holes, the clamping blocks, and the clamping slots; the projection plate is provided with starry sky and galaxy patterns; light emitted by the light source illuminates the projection plate; and then the optical lens focuses the light on a specified region to form clear starry sky and galaxy patterns, thereby simulating a real star cloud effect, and achieving better projection effect and interestingness. Meanwhile, the first casing and the second casing are respectively arranged on the two sides of the top of the lamp holder, the connecting holes are uniformly formed on the side of the first casing close to the second casing, and the connecting posts corresponding to the connecting holes are uniformly arranged on the side of the second casing close to the first casing, such that the first casing and the second casing can be spliced and fixed. Meanwhile, the clamping slots are uniformly arranged on outer sides of the bottoms of the first casing and the second casing, and the clamping blocks in snap fitting with the clamping slots are uniformly arranged on the outer side of the lamp holder, facilitating connection between the first casing, the second casing, and the lamp holder. Thus, the projection lamp can be assembled and disassembled conveniently, facilitating overhaul and maintenance when a fault occurs.

BRIEF DESCRIPTION OF FIGURES

To describe the technical solutions in the embodiments of the present disclosure more clearly, the following briefly describes the accompanying drawings required for describing the embodiments. It is appreciated that the accompanying drawings below show merely some embodiments of the present disclosure and thus should not be considered as a limitation on the scope. Persons of ordinary skill in the art may still derive other related drawings from the accompanying drawings without creative efforts.

In the figures: 1. lamp holder; 2. light source; 3. ball head screw; 4. clamping block; 5. button; 6. film cover; 7. optical lens; 8. lens sleeve; 9. bracket; 10. projection plate; 11. first casing; 12. connecting hole; 13. decorative plate; 14. second casing; 15. reserved hole; 16. clamping slot; 17. ball head screw hole; 18. base; 19. bottom plate; 20. control panel; 21. fastener; and 22. heat dissipation slot.

DETAILED DESCRIPTION

The following clearly and completely describes the technical solutions in the embodiments of the present disclosure with reference to the accompanying drawings in the embodiments of the present disclosure. All other embodiments obtained by persons of ordinary skill in the art based on the embodiments of the present disclosure without creative efforts shall fall within the protection scope of the present disclosure.

Figure 1:
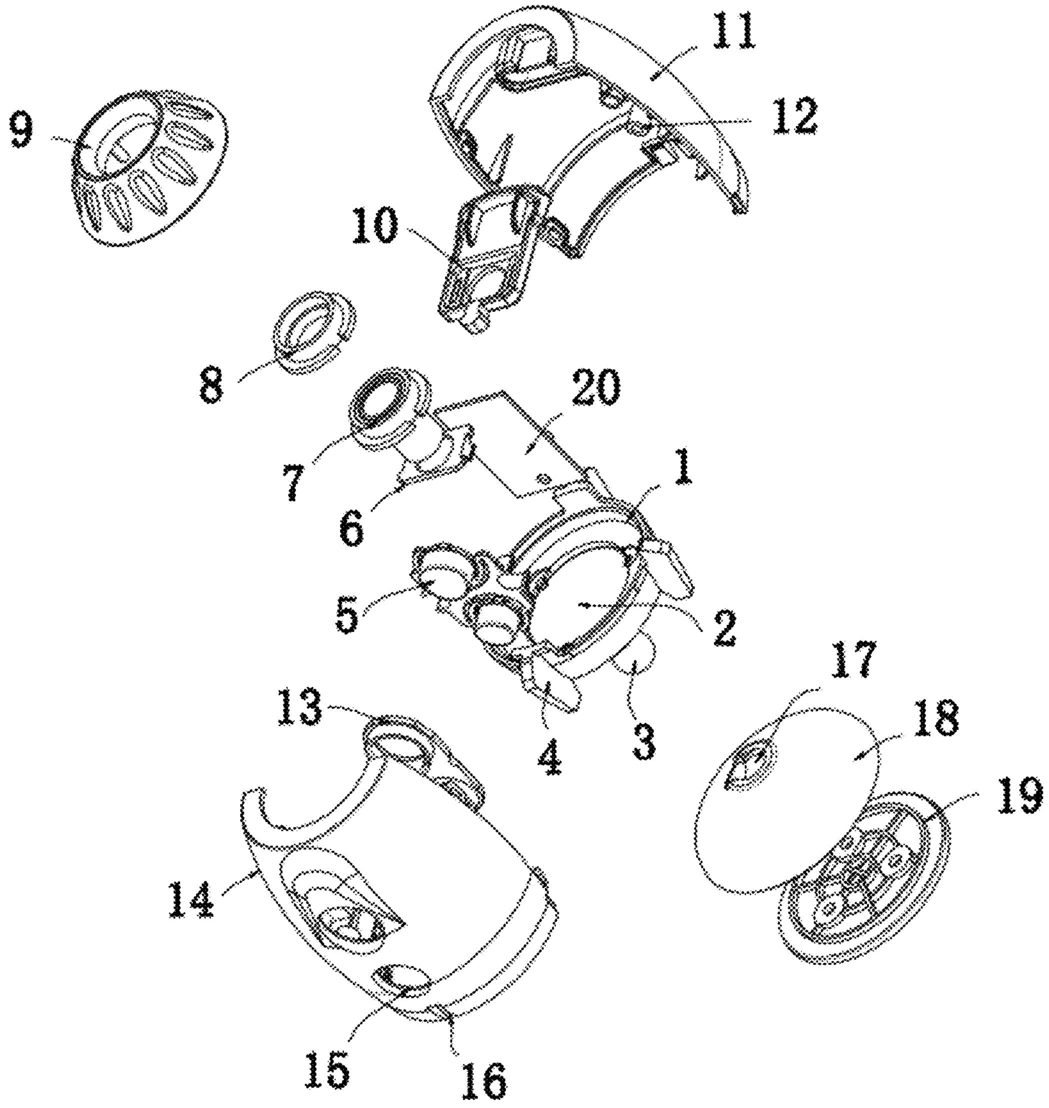
FIG. 1 is a schematic structural exploded view of the present disclosure.
Figure 2:
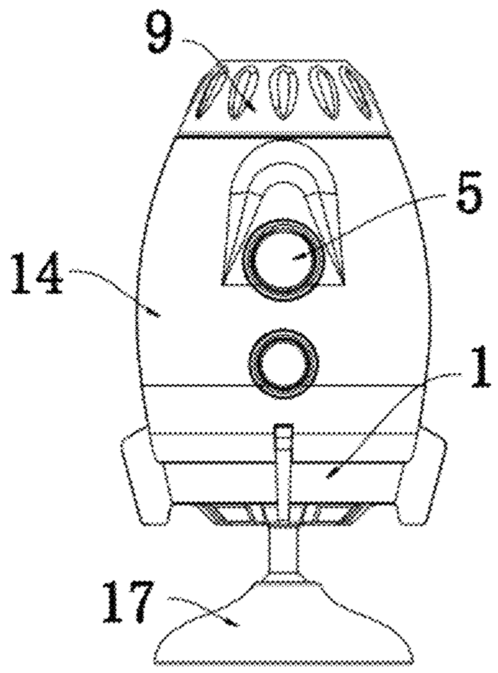
FIG. 2 is a schematic structural front view of the present disclosure.
Figure 3:
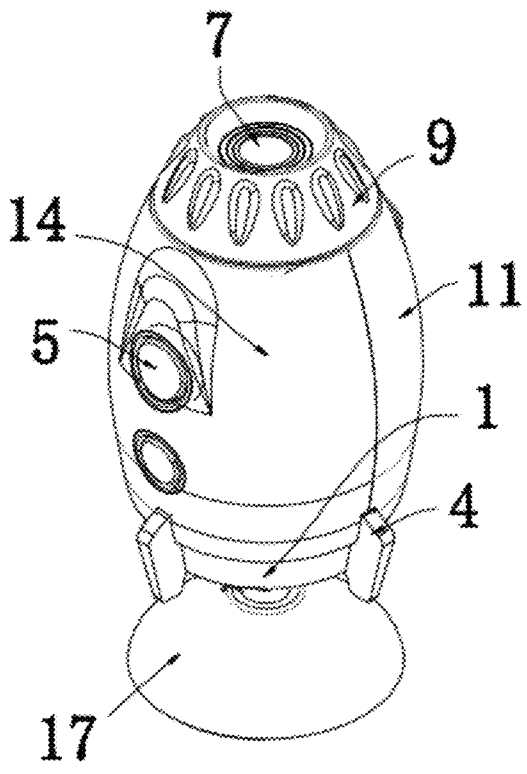
FIG. 3 is a schematic three-dimensional structural side view of the present disclosure.
Figure 4:
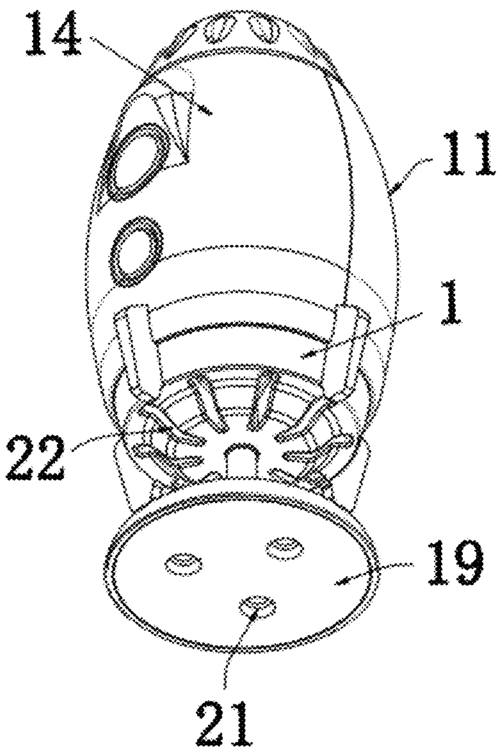
FIG. 4 is a schematic three-dimensional structural bottom view of the present disclosure.

Referring to FIG. 1 to FIG. 4, the present disclosure provides an embodiment: A projection lamp for producing starry sky and galaxy effects includes a lamp holder 1, a light source 2, an optical lens 7, and a first casing 11. The light source 2 is arranged on one side of the lamp holder 1; the first casing 11 is arranged on one side of the top of the lamp holder 1; the second casing 14 is arranged on the other side of the top of the lamp holder 1; and a control panel 20 is arranged inside the second casing 14 and the first casing 11.

The control panel 20 is provided with a button 5, and a decorative plate 13 is arranged on one side of the button 5. The second casing 14 is provided with a reserved hole 15, the button 5 extends through the reserved hole 15 to outside of the second casing 14, and the projection lamp is turned on through the button 5, such that the light source 2 emits light.

A bracket 9 is arranged at top ends of the first casing 11 and the second casing 14, the optical lens 7 is arranged inside the bracket 9 through the lens sleeve 8, a projection plate 10 is arranged between the optical lens 7 and the light source 2, and a film cover 6 is arranged on one side of the projection plate 10.

The projection plate 10 is provided with starry sky and galaxy patterns. Light emitted by the light source 2 illuminates the projection plate 10, and then the optical lens 7 focuses the light on a specified region to form clear starry sky and galaxy patterns, thereby simulating a real star cloud effect, and achieving better projection effect and interestingness.

Heat dissipation slots 22 are uniformly formed at the bottom of the lamp holder 1, the heat dissipation slots 22 are distributed in a concentric circle structure with respect to the lamp holder 1 to achieve a heat dissipation effect, so as to allow the projection lamp to run stably.

A base 18 is arranged at the bottom of the lamp holder 1. The base 18 is an umbrella-shaped structure, a bottom plate 19 is arranged at a bottom end of the base 18, and the bottom plate 19 is fixedly connected to the base 18 through 3 groups of fasteners 21.

A ball head screw hole 17 is formed at the top of the base 18, a ball head screw 3 is arranged at the bottom of the lamp holder 1, and the ball head screw 3 is connected to the ball head screw hole 17.

The ball head screw 3 at the bottom of the lamp holder 1 is correspondingly connected to the ball head screw hole 17 at the top of the base 18, and the projection lamp is placed in a use region through the base 18. Meanwhile, an illumination angle of the projection lamp can be adjusted through the ball head screw 3, so as to meet different use requirements.

Connecting holes 12 are uniformly formed on one side of the first casing 11 close to the second casing 14, and connecting posts corresponding to the connecting holes 12 are uniformly arranged on one side of the second casing 14 close to the first casing 11, such that the first casing 11 and the second casing 14 can be spliced and fixed.

Clamping slots 16 are uniformly arranged at the bottoms of the first casing 11 and the second casing 14, and clamping blocks 4 matched with the clamping slots 16 are uniformly arranged on an outer side of the lamp holder 1.

This facilitates connection between the first casing 11, the second casing 14, and the lamp holder 1, such that the projection lamp can be conveniently assembled and disassembled, facilitating overhaul and maintenance when a fault occurs.

Specific model specifications of the light source 2, the control panel 20, and the optical lens 7 need to be determined according to model selection calculation of specification parameters and the like of the device, and the model selection calculation method is the prior art. Therefore, this is not described in detail.

Working principle: When the embodiment of this application is in use, the ball head screw 3 at the bottom of the lamp holder 1 is correspondingly connected to the ball head screw hole 17 at the top of the base 18; the projection lamp is placed in the use region through the base 18; the projection plate 10 is provided with starry sky and galaxy patterns; the projection lamp is turned on through the button 5; light emitted by the light source 2 on the lamp holder 1 illuminates the projection plate 10; and then the optical lens 7 focuses the light on a specified region to form clear starry sky and galaxy patterns, thereby simulating a real star cloud effect, and achieving better projection effect and interestingness. An illumination angle of the projection lamp can be adjusted through the ball head screw 3, so as to meet different use requirements. Meanwhile, the first casing 11 and the second casing 14 are respectively arranged on the two sides of the top of the lamp holder 1, the connecting holes 12 are uniformly formed on the side of the first casing 11 close to the second casing 14, and the connecting posts corresponding to the connecting holes 12 are uniformly arranged on the side of the second casing 14 close to the first casing 11, such that the first casing 11 and the second casing 14 can be spliced and fixed. Meanwhile, the clamping slots 16 are uniformly arranged on outer sides of the bottoms of the first casing 11 and the second casing 14, and the clamping blocks 4 in snap fitting with the clamping slots 16 are uniformly arranged on the outer side of the lamp holder 1, facilitating the connection between the first casing 11, the second casing 14, and the lamp holder 1. Thus, the projection lamp can be assembled and disassembled conveniently, facilitating overhaul and maintenance when a fault occurs.

Apparently, the described embodiments are merely some rather than all of the embodiments of the present disclosure. All other technical solutions obtained by persons of ordinary skill in the art based on the embodiments of the present disclosure fall within the protection scope of the present disclosure.

What is claimed is:

1. A projection lamp for producing starry sky and galaxy effects, comprising: a lamp holder, a light source, an optical lens, and a first casing, wherein the light source is arranged on one side of the lamp holder; the first casing is arranged on one side of the top of the lamp holder; a second casing is arranged on the other side of the top of the lamp holder; clamping slots uniformly arranged at bottom of the first casing and bottom of the second casing; clamping blocks uniformly arranged on an outer side of the lamp holder, wherein the clamping blocks are fastened to the clamping slots; a control panel is arranged inside the first casing and the second casing; a bracket is arranged at top ends of the second casing and the first casing; the optical lens is arranged inside the bracket through a lens sleeve; a projection plate is arranged between the optical lens and the light source; a film cover is arranged on one side of the projection plate; and a plurality of heat dissipation slots is uniformly formed in a concentric circle structure at bottom of the lamp holder.

2. The projection lamp for producing starry sky and galaxy effects according to claim 1, wherein a base is arranged at the bottom of the lamp holder, a ball head screw hole is formed at the top of the base, a ball head screw is arranged at the bottom of the lamp holder, and the ball head screw is connected to the ball head screw hole.

3. The projection lamp for producing starry sky and galaxy effects according to claim 1, wherein connecting holes are uniformly formed on one side of the first casing close to the second casing, and connecting posts corresponding to the connecting holes are uniformly arranged on one side of the second casing close to the first casing.

4. The projection lamp for producing starry sky and galaxy effects according to claim 2, wherein the base is an umbrella-shaped structure, a bottom plate is arranged at a bottom end of the base, and the bottom plate is fixedly connected to the base through 3 groups of fasteners.

5. The projection lamp for producing starry sky and galaxy effects according to claim 1, wherein the control panel is provided with a button, and a decorative plate is arranged on one side of the button.

6. The projection lamp for producing starry sky and galaxy effects according to claim 5, wherein the second casing is provided with a reserved hole, and the button extends through the reserved hole to outside of the second casing.

* * * * *